(12) United States Patent
Hasegawa et al.

(10) Patent No.: US 7,337,364 B2
(45) Date of Patent: Feb. 26, 2008

(54) CONTENTS DISTRIBUTION SUPPORTING APPARATUS AND PROGRAM

(75) Inventors: Yutaka Hasegawa, Hamamatsu (JP); Kazuhiro Ama, Misato (JP)

(73) Assignee: Yamaha Corporation, Shizuoka-Ken (JP)

( * ) Notice: Subject to any disclaimer, the term of this patent is extended or adjusted under 35 U.S.C. 154(b) by 387 days.

(21) Appl. No.: 10/880,068

(22) Filed: Jun. 29, 2004

(65) Prior Publication Data

US 2005/0021362 A1    Jan. 27, 2005

(30) Foreign Application Priority Data

Jun. 30, 2003    (JP)    ............... 2003-186718

(51) Int. Cl.
*G06F 11/00*    (2006.01)
(52) U.S. Cl. .......................................... 714/38; 705/26
(58) Field of Classification Search ................. 714/38, 714/37, 39; 705/14, 16, 17, 26
See application file for complete search history.

(56) References Cited

U.S. PATENT DOCUMENTS

| | | | |
|---|---|---|---|
| 6,356,878 B1 * | 3/2002 | Walker et al. ................. | 705/26 |
| 6,980,962 B1 * | 12/2005 | Arganbright et al. ......... | 705/26 |
| 2001/0051996 A1 * | 12/2001 | Cooper et al. ............... | 709/217 |
| 2002/0053090 A1 * | 5/2002 | Okayama et al. ............ | 725/152 |
| 2002/0087396 A1 | 7/2002 | Shida | |
| 2003/0128391 A1 * | 7/2003 | Sato ........................... | 358/1.18 |
| 2003/0131252 A1 * | 7/2003 | Barton ........................ | 713/193 |
| 2003/0154132 A1 * | 8/2003 | Ogawa et al. ................. | 705/16 |
| 2004/0054584 A1 * | 3/2004 | Boon ........................... | 705/14 |

FOREIGN PATENT DOCUMENTS

| | | |
|---|---|---|
| JP | 2002015157 | 1/2002 |
| JP | 2002099746 | 4/2002 |

* cited by examiner

*Primary Examiner*—Nadeem Iqbal
(74) *Attorney, Agent, or Firm*—Harness, Dickey & Pierce, PLC

(57) ABSTRACT

A contents distribution supporting apparatus which enables contents to be distributed on a network without using cash as the medium of transaction. A database records user's points, and a storage accumulates contents to be provided for the users. When contents are received from the users via the network and accumulated in the storage, a first additional point value is added to a value of points owned by a user who has provided contents. On the other hand, when contents read out from the storage are provided for the users via the network, a subtractive point value is subtracted from a value of the points owned by a user who has been provided with the contents, and a second additional point value is added to a value of the points owned by a user who has provided the contents.

2 Claims, 4 Drawing Sheets

CONTENTS DISTRIBUTION SUPPORTING APPARATUS AND PROGRAM

BACKGROUND OF THE INVENTION

1. Field of the Invention

The present invention relates to a contents distribution supporting apparatus and program which supports smoothing and activation of contents distribution on a network.

2. Description of the Related Art

Conventionally, there has been a mail-order service using a communication network, in which contents (products) such as various data, software, and services existing on a public communication network such as the Internet are purchased on credit, for example.

Also, there has been known a service in which "points" are issued when a user purchases products for cash or on credit, and in subsequent purchases, the purchased amount is discounted according to the points.

There has been proposed a system which accumulates points as mentioned above in user accounts provided in e.g. a database on a communication network so that the points can be shared among a plurality of shops or the like connected to the communication network (refer to Japanese Laid-Open Patent Publication (Kokai) No. 2002-32857, for example).

However, in the above described way of contents distribution on a communication network, even if contents are provided at low price (for example, a piece of music for 100 yen), it is necessary to pay in cash or on credit based on cash and hence users may be reluctant to purchase contents.

SUMMARY OF THE INVENTION

It is a first object of the present invention to provide a contents distribution supporting apparatus and program which enables contents to be distributed on a network without using cash as the medium of transaction.

It is a second object of the present invention to provide a contents distribution supporting apparatus and program which can smooth and activate the distribution of contents on a network.

To attain the above objects, in a first aspect of the present invention, there is provided a contents distribution supporting apparatus comprising a point recording device that records points owned by users, a contents accumulating device that accumulates contents to be provided for the users, a contents receiving device that receives contents from the users via a network and accumulates the received contents in the contents accumulating device, and adds a first additional point value to a value of points owned by a user who has provided contents, and a contents providing device that provides a user with contents read out from the contents accumulating device via the network, and subtracts a subtractive point value from a value of the points owned by a user who has been provided with the contents, and adds a second additional point value to a value of the points owned by a user who has provided the contents.

According to the first aspect of the present invention, contents can be distributed without using cash as the medium of transaction. Also, the distribution of contents can be smoothed and activated.

To attain the above objects, in a second aspect of the present invention, there is provided a contents distribution supporting program executable by a server computer comprising a point recording device that records points owned by users, and a contents accumulating device that accumulates contents to be provided for the users, comprising a contents receiving module for receiving contents from the users via a network and accumulating the received contents in the contents accumulating device, and adding a first additional point value to a value of points owned by a user who has provided contents, and a contents providing module for providing a user with contents read out from the contents accumulating device via the network, and subtracts a subtractive point value from a value of the points owned by a user who has been provided with the contents, and adds a second additional point value to a value of the points owned by a user who has provided the contents.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
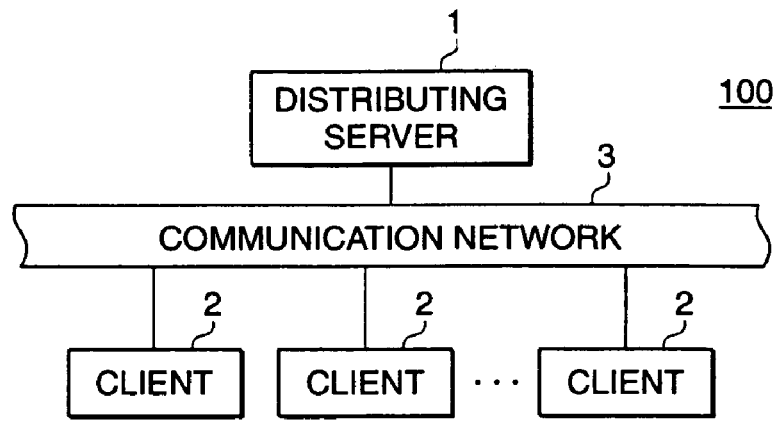
FIG. 1 is a block diagram showing the basic construction of a contents distribution supporting system according to an embodiment of the present invention.

FIG. 1 is a block diagram showing the basic construction of a contents distribution supporting system 100 according to an embodiment of the present invention.

The contents distribution supporting system 100 is a Web service system that is comprised of at least a contents distribution supporting apparatus (distribution server) 1, a plurality of client apparatuses (hereinafter referred to as "clients") 2, and a communication network 3 as a wide-area communication network such as the Internet, a LAN, or a telephone line, which connects the plurality of clients 2 so that they can communicate with each other.

Figure 3:
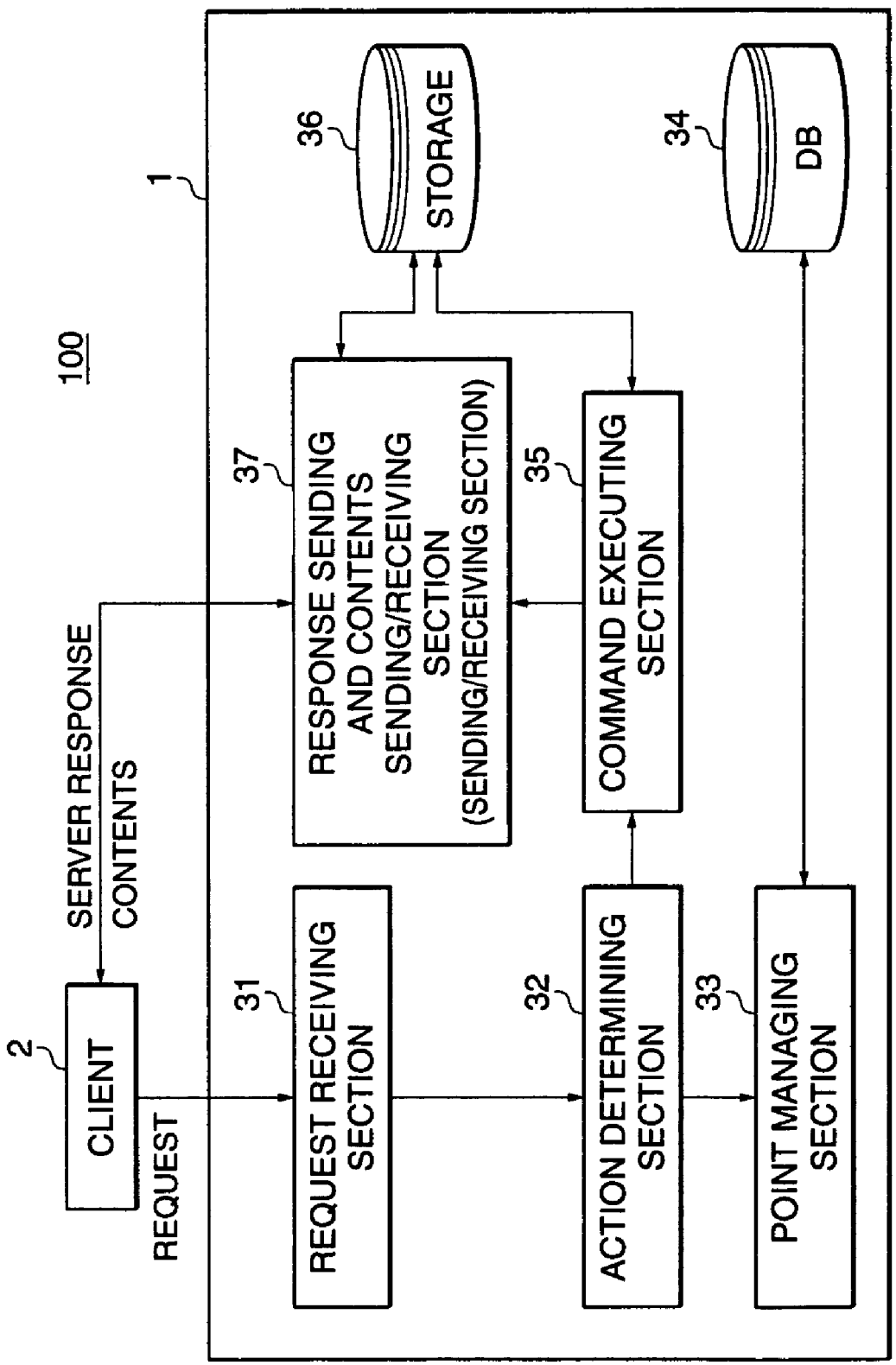
FIG. 3 is a block diagram showing the functions of the contents distribution supporting apparatus.

The contents distribution supporting apparatus 1 is e.g. a network server implemented by a computer (PC) or the like, for example, may be a WWW server (a server which provides contents for clients using a protocol such as HTTP). As shown in FIG. 3, the contents distribution supporting apparatus 1 includes a storage 36 for storing contents and a user database (DB) 34 for managing points for users and others. It should be noted that the contents distribution supporting apparatus 1 may be implemented by a plurality of computers connected to each other via e.g. a communicator network.

The clients 2 are each a network terminal which is capable of executing WWW viewing software such as a Web browser, and connecting to the contents distribution supporting apparatus 1 via the communication network 3. Each client 2 is implemented by e.g. a personal computer, but may be implemented by any apparatus insofar as it can directly or indirectly (via another apparatus) connect to the communication network 3. For example, each client 2 may be implemented by an electronic music apparatus, a game machine, a mobile phone terminal, a PDA, or a car navigation system. It should be noted that in the present specification, an electronic music apparatus means not only an electronic musical instrument such as a keyboard, a synthesizer or a sampler, but also a wide variety of music apparatuses which handle music, such as a tone generator or a mixer.

In the contents distribution supporting system 100 according to the present embodiment, a user accesses the contents distribution supporting apparatus 1 through operation of his/her client 2, and uploads a desired file (such as a music file, an image file, or a moving image file). The contents distribution supporting apparatus 1 stores the uploaded file in the storage 36, while it lays open the uploaded file for other users, and gives predetermined points to a user account corresponding to the user who has uploaded the file. A user can download files (contents), which have been uploaded by other users and stored in the storage 36, using points obtained by e.g. uploading files. The contents distribution supporting apparatus 1 subtracts predetermined points from a user account corresponding to a user who has requested to download files, and adds predetermined points to a user account corresponding to a user who has uploaded the downloaded files.

In this way, giving points to a user who has taken a predetermined action (for example, uploading of files) prompts him/her to upload contents. This realizes a cycle which consists of provision of contents (files), acquisition of points, acquisition of contents (files), and usage of points, which can smooth and activate the distribution of contents.

Figure 2:
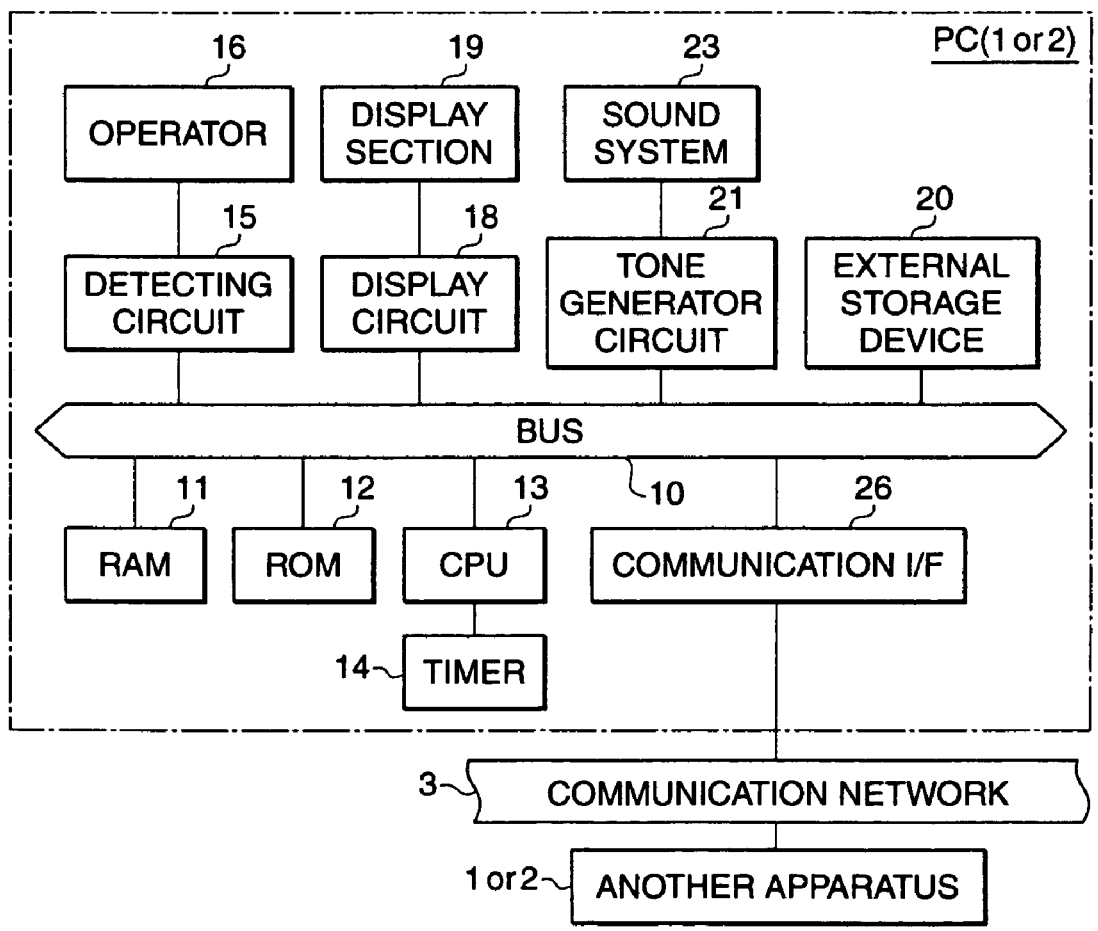
FIG. 2 is a block diagram showing the basic construction of a computer PC constituting a contents distribution supporting apparatus or a client apparatus appearing in FIG. 1.

FIG. 2 is a block diagram showing the basic construction of a computer PC constituting the contents distribution supporting apparatus 1 or the client 2.

A RAM 11, a ROM 12, a CPU 13, a detecting circuit 15, a display circuit 18, an external storage device 20, a tone generator circuit 21, and a communication interface (I/F) 26 are connected to a bus 10 of the computer PC (the contents distribution supporting apparatus 1 or the client 2).

Figure 4:
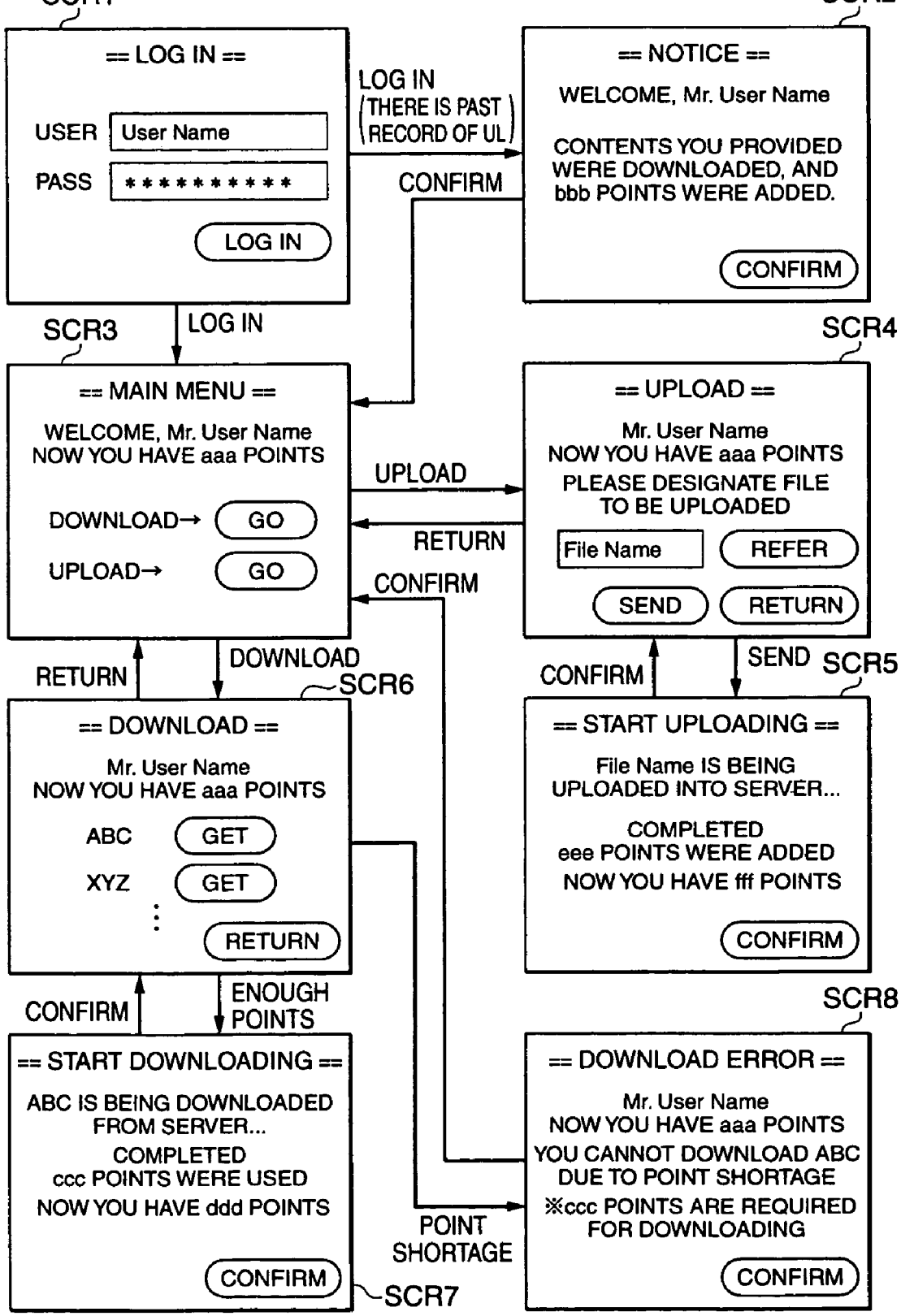
FIG. 4 is a flow chart showing changes in a screen displayed by the client apparatus.

A user can make various settings using an operator 16 connected to the detecting circuit 15. The display circuit 18 is connected to a display section 19, for displaying a screen SCR as shown in FIG. 4 in the case where the computer PC is used as the client 2.

The external storage device 20 can store various kinds of data, and programs for implementing the present embodiment. It should be noted that in the case where the computer PC is used as the contents distribution supporting apparatus 1, the database 34 and the storage 36 appearing in FIG. 3 are provided within the external storage device 20.

The RAM 11 includes flags, registers or buffers, and a working area for operation of the CPU 13, which stores various parameters and others. The ROM 12 can store various parameters and control programs, or e.g. programs for implementing the present embodiment. The CPU 13 carries out arithmetic operations or provides control in accordance with control programs and others stored in the ROM 12 or the external storage device 20. A timer 14 is connected to the CPU 13, for supplying basic clock signals, interrupt timing, and so forth to the CPU 13.

The tone generator circuit 21 generates a musical tone signal according to performance data recorded in e.g. the external storage device 20, or a performance signal such as a MIDI signal downloaded via the communication interface 26 from the Internet, and supplies the generated musical tone signal to a sound system 23. The sound system 23 includes a D/A converter and a speaker, and converts supplied musical tone signals in digital format into analog format, and sound them.

The communication interface 26 is at least connected to another apparatus, for sending and receiving various kinds of information and others. It should be noted that the communication interface 26 should not necessarily be wired, but may be wireless, or may be wired and wireless.

FIG. 3 is a block diagram showing the functions of the contents distribution supporting apparatus 1.

A request receiving section 31 receives and analyzes request information transmitted from a user by his/her client 2, and supplies the analyzed request information to an action determining section 32. Here, the request information received from the user is a request to refer to a page on a WWW server (the contents distribution supporting apparatus 1) or a CGI (Common Gateway Interface) application execution request. Examples of processing to be carried out in accordance with the CGI application execution request executed by the contents distribution supporting apparatus 1 include a contents downloading process, a contents uploading process, and a point managing process.

The action determining section 32 receives the request information analyzed by the request receiving section 31, and sends a command for executing an action corresponding to the request information to a command executing section 35. However, if the request information corresponds to a particular action (downloading and uploading), the action determining section 32 refers to a point managing section 33 for the number of points owned by the user, and determines whether the number of user' points updated as a result of the action will become not less than zero. Only when the number of points will become not less than zero, the action determining section 32 sends a command for executing the action corresponding to the request information to the command executing section 35, and instructs the point managing section 33 to update the points. If determining that the number of user's points will become less than zero, the action determining section 32 nullifies the request made by the user, and sends a command for notifying the user to this effect to the command executing section 35.

The point managing section 33 refers to the database (DB) 34, described later, and updates points owned by the user according to the information sent from the action determining section 32. For example, the point managing section 33 subtracts predetermined points from points owned by a user who has downloaded files, and adds predetermined points to points owned by a user (creator) who has uploaded the downloaded contents. The point managing section 33 also adds predetermined points to points owned by a user who has uploaded new contents.

The database (DB) 34 is for managing points owned by respective users, and records user accounts for the respective users. At least information which identify users (the clients 2) (e.g. user IDs and passwords) and points owned by the users associated with the information are recorded in respective user accounts. If contents are uploaded, a contents uploading history is recorded in the corresponding user account. It should be noted that the contents downloading history may also be recorded in the user account of the user who has downloaded contents and (or) the user who has uploaded the downloaded contents.

The command executing section 35 executes a command sent from the action determining section 32. For example, if a command corresponding to a downloading request from a user is received, the command executing section 35 reads out a file (contents) to be downloaded from the storage 36, and sends it to the user via a sending/receiving section 37. Also, for example, if a command corresponding to an uploading request from a user is received, the command executing section 35 receives a file (contents) to be uploaded by the user from the sending/receiving section 37, and stores it in the storage 36. Further, a server response message (page information described in HTML, for example) corresponding to a request from a user is sent to the user via the sending/receiving section 37 according to a command received from the action determining section 32.

The storage 36 stores a plurality of contents to be provided for users (contents which can be downloaded by users via the clients 2), and screen information (including an HTML file) to be displayed in the display sections 19 of the clients 2. If an uploading request from a user is received, the storage 36 stores contents uploaded by the user in a predetermined region thereof so that the contents can be downloaded by other users. Here, the contents include data which can be sent and received via the communication network 3, such as various kinds of data such as a music file, an image file, a moving image file, and software programs.

In accordance with an instruction from the command executing section 35, the sending/receiving (response sending and contents sending/receiving) section 37 sends contents and screen information read out from the storage 36 to the corresponding client 2 (user) via the communication network 3, and receives an upload file (contents) sent from the client 2 and sends it to the storage 36.

FIG. 4 is a flow chart showing changes in the screen SCR displayed by the client 2. Screens SCR1 to SCR8 are each displayed in the display section 19 of the client 2 according to server responses (screen information) returned from the contents distribution supporting apparatus 1 in response to user's requests sent from the client 2.

The screen SCR1 is displayed when the client 2 is connected to the contents distribution supporting apparatus 1 via the communication network 3. A user inputs his/her user name and password via the screen SCR1, and then operates a login button. In response to the operation of the login button, a login request is sent from the client 2 to the contents distribution supporting apparatus 1. In accordance with the request, the contents distribution supporting apparatus 1 ascertains whether or not the corresponding user account is recorded in the database 34. If the corresponding user account is recorded in the database 34, the screen information of the screen SCR2 or the screen SCR3 is sent as a server response to the client 2 according to the user's contents uploading history.

If the user has uploaded contents in the past, and his/her points have changed (for example, the contents he/she provided have been downloaded by other users) after his/her pervious login, the screen information of the screen SCR2 is sent to notify this to the client 2. The screen SCR2 notifies the user that the contents have been downloaded, and his/her points have changed (e.g. how many points have been added). It should be noted that it is possible to notify the user which of the contents has been downloaded and how many times the contents has been downloaded. When a confirmation button is operated on the screen SCR2, the screen information of the screen SCR3 is sent to the client 2 since the screen SCR3 is linked to the screen SCR2.

On the other hand, if the user has not uploaded any contents in the past, or if the user has uploaded contents but his/her points have not changed, the screen information of the screen SCR3 is sent to the client 2. The screen SCR3 shows how many points are currently owned by the user who has logged in, and buttons corresponding to a downloading request and an uploading request are displayed.

When the button corresponding to the uploading request is operated on the screen SCR3, the screen information of the screen SCR4 is sent to the client 2. In accordance with an instruction on the displayed screen SCR4, the user enters the file name (including an address where contents are stored) of contents to be uploaded, and operates a send button. In response to the operation of the send button, the uploading request as well as the file name of contents to be uploaded is sent to the contents distribution supporting apparatus 1. It should be noted that to cancel uploading, a return button is operated on the screen SCR4 so that the screen SCR2 can be displayed again.

When the contents distribution supporting apparatus 1 receives the uploading request, the screen information of the screen SCR5 is sent to the client 2. During uploading of the contents, as shown in FIG. 4, only a message on the upper side on the screen SCR5, which notifies that the contents are being uploaded is displayed, and when the uploading is completed, a message which notifies the uploading is completed, and additional points corresponding to the uploading and points after addition are displayed on the lower side. When a confirmation button is operated, the screen SCR4 is displayed again.

When the button corresponding to the downloading request is operated on the screen SCR3, the screen information of the screen SCR6 is sent to the client 2. The screen SCR6 shows how many points are currently owned by the user, and a list of contents which can be downloaded at present by the user. A GET button for sending a request to download contents is provided in the vicinity of each of the contents on the list. It should be noted that, instead of displaying the list of contents on the screen SCR6, contents to be downloaded may be searched for using various kinds of information such as a file name (the name of contents), a creator name, a size, and a genre on the screen SCR6.

Upon operation of the GET button, a request to download the corresponding contents is sent to the contents distribution supporting apparatus 1. The contents distribution supporting apparatus 1 compares the number of points required for downloading the contents with the number of points currently owned by the user. If the user owns enough points (user's points aaa>necessary points ccc), the screen information of the screen SCR7 and the contents are sent to the client 2. On the other hand, if the user does not own enough points (user's points aaa<necessary points ccc), the screen information of the screen SCR8 showing a message which notifies that the contents cannot be downloaded due to the shortage of points, and a message which notifies necessary points to download the contents is sent to the client 2. When a confirmation button is operated on the screen SCR8, the screen SCR3 is displayed again.

When the contents distribution supporting apparatus 1 receives the downloading request (in the case where the user owns enough points), the screen information of the screen SCR7 is sent to the client 2. During downloading of the contents, only a message on the upper side on the, screen SCR7, which notifies that the contents are being downloaded is displayed, and when the downloading is completed, a message which notifies the downloading is completed, and used (subtractive) points corresponding to the downloading and points after subtraction are displayed on the lower side. When a confirmation button is operated on the screen SCR7, the screen SCR6 is displayed again.

Figure 5:
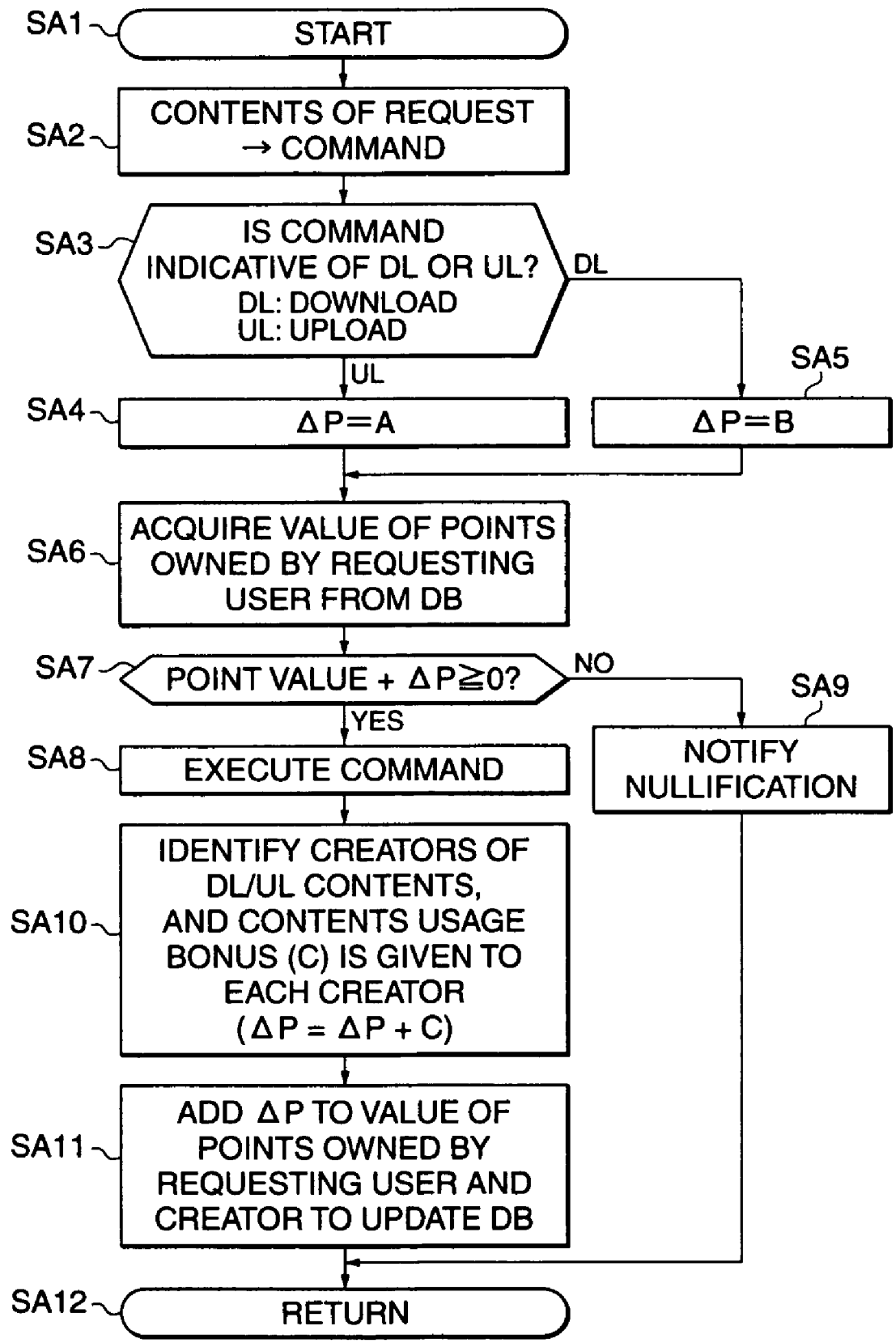
FIG. 5 is a flow chart showing a process which is carried out by a CGI application executed by the contents distribution supporting apparatus.

FIG. 5 is a flow chart showing a process carried out in accordance with a CGI application executed by the contents distribution supporting apparatus 1.

It should be noted that in the flow chart of FIG. 5, it is assumed for the convenience of explanation that a user makes only one of a downloading request or an uploading request. Specifically, the CGI application is intended to cause the client 2 to display the screens SCR3 to SCR8 appearing in FIG. 4. Further, user's requests to display the screens SCR1 and SCR2 appearing in FIG. 4 may be actually indicated by different URLs, and should not necessarily be executed in accordance with the same program, but if the user's requests to display the screens SCR1 and the SCR2 are executed by the CGI application, screen information of the screen SCR1 is sent immediately after execution of a step SA1, described hereinafter, and a branch for sending the screen information of the screen SCR2 is provided for a step SA3, described hereinafter so that when the user gives a request other than a downloading or uploading request, a server response (screen information) corresponding to the request is sent to the client 2.

In the step SA1, the CGI application is started, and the process proceeds to a step SA2. It is assumed that in the step SA1, the user has already logged in, and the screen information of the screen SCR3 appearing in FIG. 4 has been sent to the client 2, so that the screen SCR3 is displayed in the display section 19 of the client 2.

In the step SA2, the contents of a user's request (downloading or uploading request) sent from the client 2 is stored as a command in a register or the like.

In the step SA3, it is determined whether the command is indicative of downloading or uploading. If the command is indicative of uploading, the process proceeds to a step SA4 as indicated by an arrow UL, and on the other hand, if the command is indicative of downloading, the process proceeds to a step SA5 as indicated by an arrow DL.

In the step SA4, in response to the uploading command, a value ΔP of points to be added to the value of points owned by the user who has made the request (requesting user) is determined so that ΔP=A. In the step SA5, in response to the downloading command, a value ΔP of points to be added to the value of points owned by the user who has made the request (requesting user) is determined so that ΔP=B. It should be noted that the value 'A' is a positive numerical value, and the value 'B' is a negative numerical value. The value |A| and the value |B| preferably has such a relationship as |B|>|A|≧0, but may have such a relationship as |A|≧|B|>0.

In the step SA6, the value of the points currently owned by the requesting user is acquired from the database (DB) 34, and in a step SA7, it is determined whether or not a value obtained by adding the value ΔP determined in the step SA4 or SA5 to the acquired value of the points currently owned by the user is not less than zero, i.e. it is determined whether a value of points obtained by updating the value of the points is positive or negative based on the assumption that an action requested by the requesting user has been taken. If the updated value of points is positive, i.e. if a file is to be uploaded or if the user owns enough points required for downloading, the process proceeds to a step SA8 as indicated by an arrow YES. If the updated value of points is negative, that is, the number of points currently owned by the user is smaller than the number of points required for downloading, the process proceeds to a step SA9 as indicated by an arrow NO, and the screen information of the screen SCR8 appearing in FIG. 4 is sent to the client 2 so as to notify the user that the user's request is invalid.

In the step SA8, the command is executed. For example, if the command is indicative of uploading, a file (contents) to be uploaded sent from the client 2 is received, and the screen information of the screen SCR5 appearing in FIG. 4 is sent to the client 2, and when the reception of the file is completed, the file is stored in the storage 36. Also, for example, if the command is indicative of downloading, the screen information of the screen SCR7 is sent to the client 2, and a requested file (contents) is read out from the storage 36, and sent to the client 2.

In a step SA10, a person (creator) who has created the file (contents) uploaded or downloaded by execution of the command in the step SA8 is identified by referring to the database 34, and a contents usage bonus (C) is given to the creator (if there are a plurality of creators, the bonus is given to each of the creators) (ΔP=ΔP+C). Namely, the additional value (A) obtained in the step SA4 and the additional value (C) obtained in the step SA10 are given to the user who has uploaded the file this time (ΔP=A+C). It should be noted that the values |A|, |B|, and |C| preferably have such a relationship as |B|>|A|+|C|>0, but may have such a relationship as |A|+|C|>|B|>0, or |A|+|C|≧|B|>0.

In a step SA11, the value ΔP is added to the values of points currently owned by the requesting user (who has downloaded or uploaded the contents) and the creator (who has created the downloaded contents) so that the number of points owned by each user, which is stored in the database 34, can be updated. As a result, the number of points owned by the user who has downloaded the contents is decreased, while the numbers of points owned by the user who has uploaded the contents and the user who created the downloaded contents are increased. Then, the process proceeds to a step SA12 wherein the process carried out by the CGI application is terminated.

It should be noted that to prevent the same contents from being redundantly uploaded by the same user, a step of comparing contents received from a user with contents which have been previously uploaded by him/her, and determining whether uploading is to be accepted or not may be additionally provided among the steps SA8 to SA10. The contents can be compared in size, date of creation, name, and so forth, or compared according to data thereof in bytes.

Also, it is possible to give warning when the same user makes a request to download the same contents twice or more. In this case, with reference to the user's downloading history, it is determined whether or not the same contents as contents requested to be downloaded this time have been previously downloaded.

As described above, according to the present embodiment, it is possible to distribute contents by increasing/decreasing points according to a predetermined action without the necessity of using cash as the medium of transaction. Therefore, it is possible to make the easiness of acquiring contents appeal to users who have been reluctant to acquire (purchase) contents due to the necessity of using cash as the medium of transaction.

Further, according to the present embodiment, it is possible to give points according to predetermined actions (for example, uploading of files, and provision of uploaded files to other users). Therefore, it is possible to accumulate points without using cash as the medium of transaction.

Further, accumulated points can be used for downloading contents uploaded (provided) by other users. Since points are used for downloading contents, users who wish to download many contents can be prompted to upload files or create and upload high quality files (which are likely to be downloaded by other users), and this activates the distribution of contents. Also, the distribution of contents can be smoothed by a cycle consisting of point accumulation and point usage.

It should be noted that although in the present embodiment, the Internet is used as a communication pathway between the server (contents distribution supporting apparatus) 1 and the clients 2, and HTTP is used as a communication protocol, the present invention is not limited to this, but any communication pathway and communication protocol may be used insofar as it is possible to authenticate users, and to download and upload contents.

Further, although in the present embodiment, a fixed value is added to (subtracted from) points owned by a user irrespective of contents and type of contents, but the additional point value or subtractive point value may be variable according to contents and type of contents. For example, the number of points required for downloading contents of a creator who is highly evaluated (e.g. the contents he/she provided have been downloaded many times) may be set to be higher than the standard additional value (B). This setting may be applied to uploading of contents.

Further, creators should not necessarily be evaluated based on the number of times the contents they provided have been downloaded, but for example, the evaluations of contents or creators may be acquired from users in downloading or in the form of questionnaires, and the number of points which are increased/decreased according to a command may be dynamically determined for each of the contents or the creators according to the acquired evaluations.

It should be noted that although in the present embodiment, the control programs are stored in the ROM, the present invention is not limited to this, but the control programs may be stored in advance in a HD, a CD-ROM, or the like and read into the RAM so as to cause the CPU to operate in the same manner as in the case where the control programs are stored in the ROM. This facilitates addition of control programs, version upgrade, and so forth.

Further, the communication interface can be connected to a communication network such as a LAN, the Internet, or a telephone line, and can be connected to a server computer via the communication network. If neither control programs nor various kinds of data are stored in a hard disk device, the communication interface is used for downloading such programs and data from the server computer.

Although the present invention has been described by way of an embodiment, it will be apparent to those skilled in the art that certain changes, modifications, combinations, and so forth may be practiced within the scope of the claims.

What is claimed is:

1. A contents distribution supporting apparatus comprising:
   a point recording device that records points owned by users;
   a contents accumulating device that accumulates contents files to be provided for the users, the contents files each including at least one of a music file, an image file, and a moving image file;
   a contents receiving device that receives contents files from the users via a network and accumulates the received contents files in said contents accumulating device, and adds a first additional point value to a value of points owned by a user who has provided one of the contents files;
   an acceptance device that accepts, from a user, information for specifying a contents file which the user wishes to be provided with;
   a determination device that determines, in response to the information being accepted, whether or not points recorded in said point recording device for the user wishing to be provided with the contents file specified by the information are higher than points required for provision of the specified contents file; and
   a contents providing device that reads out the specified contents file from said contents accumulating device and provides the specified contents file via the network to the user wishing to be provided with the specified contents file when it is determined that the points recorded for the user wishing to be provided with the specified contents file are higher than the points required for the provision of the specified contents file, and subtracts a subtractive point value from a value of the points owned by the user who has been provided with the specified contents file, and further adds a second additional point value to a value of the points which has been owned by a user who has provided the specified contents file and to which the first additional point value has been added,
   wherein said contents providing device does not download the specified contents file from said contents accumulating device when it is determined that the points recorded for the user wishing to be provided with the specified contents file are not higher than the points required for the provision of the specified contents file.

2. A computer-readable storage medium storing a contents distribution supporting program executable by a server computer comprising a point recording device that records points owned by users, and a contents accumulating device that accumulates contents files to be provided for the users, the contents files each including at least one of a music file, an image file, and a moving image file, comprising:
   a contents receiving module for receiving contents files from the users via a network and accumulating the received contents files in the contents accumulating device, and adding a first additional point value to a value of points owned by a user who has provided one of the contents files;
   an acceptable module for accepting from a user, information for specifying a contents file which the user wishes to be provided with;
   a determination module for determining, in response to the information being accepted, whether or not points recorded in the point recording device for the user wishing to be provided with the contents file specified by the information are higher than points required for provision of the specified contents file; and a contents providing module for reading out the specified contents file from the contents accumulating device, and providing the specified contents file via the network to the user wishing to be provided with the specified contents file when it is determined that the points recorded for the user wishing to be provided with the specified contents file are higher than the points required for the provision of the specified contents file, and for subtracting a subtractive point value from a value of the points owned by the user who has been provided with the specified contents file, and further adding a second additional point value to a value of the points which has been owned by a user who has provided the specified contents file and to which the first additional point value has been added, wherein said contents providing module does not download the specified contents file from the contents accumulating device when it is determined that the points recorded for the user wishing to be provided with the specified contents file are not higher than the points required for the provision of the specified contents file.

* * * * *